(12) United States Patent
Li et al.

(10) Patent No.: US 12,452,850 B2
(45) Date of Patent: Oct. 21, 2025

(54) BEAM DETERMINATION APPARATUS, USER EQUIPMENT AND NETWORK DEVICE

(71) Applicant: DATANG MOBILE COMMUNICATIONS EQUIPMENT CO., LTD., Beijing (CN)

(72) Inventors: Hui Li, Beijing (CN); Runhua Chen, Beijing (CN); Qiubin Gao, Beijing (CN); Lei Wang, Beijing (CN); Yajuan Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 436 days.

(21) Appl. No.: 18/003,437

(22) PCT Filed: Apr. 12, 2021

(86) PCT No.: PCT/CN2021/086622
§ 371 (c)(1),
(2) Date: Dec. 27, 2022

(87) PCT Pub. No.: WO2022/001281
PCT Pub. Date: Jan. 6, 2022

(65) Prior Publication Data
US 2023/0300812 A1    Sep. 21, 2023

(30) Foreign Application Priority Data
Jun. 28, 2020 (CN) .......................... 202010599204.7

(51) Int. Cl.
*H04W 4/00* (2018.01)
*H04W 72/044* (2023.01)

(52) U.S. Cl.
CPC ................. *H04W 72/046* (2013.01)

(58) Field of Classification Search
CPC .. H04W 72/046; H04W 72/23; H04B 7/0695; H04B 7/088; H04L 5/0044; H04L 5/0053; H04L 5/0094; H04L 5/0023
See application file for complete search history.

(56) References Cited

U.S. PATENT DOCUMENTS

| 2018/0368142 A1 | 12/2018 | Liou |
| 2020/0022126 A1 | 1/2020 | You et al. |

(Continued)

FOREIGN PATENT DOCUMENTS

| CN | 108632007 A | * 10/2018 | ........... H04L 5/0053 |
| CN | 109152054 A | 1/2019 | |

(Continued)

OTHER PUBLICATIONS

WO 2019/154423 A1: English version; Aug. 15, 2019.*
(Continued)

*Primary Examiner* — Thai Dinh Hoang
(74) *Attorney, Agent, or Firm* — Ladas & Parry, LLP

(57) ABSTRACT

Disclosed are a beam determination apparatus, a UE and a network device. A beam determination method performed by the UE includes: determining, by the UE, whether a common beam state is a valid state; and in case that the common beam state is the valid state, determining, by the UE, that at least two channels and/or reference signals of the UE use the same beam for transmission.

15 Claims, 3 Drawing Sheets

--- determining, by the network device, whether a common beam state is a valid state — 31 when the common beam state is the valid state, determining, by the network device, that at least two channels and/or reference signals of the UE use the same beam for transmission — 32

(56) References Cited

U.S. PATENT DOCUMENTS

2020/0350972 A1* 11/2020 Yi .................... H04L 5/0051
2021/0250152 A1    8/2021 Zhang et al.

FOREIGN PATENT DOCUMENTS

| CN | 109962756 A * | 7/2019 | ........... H04B 7/0617 |
| CN | 110418412 A | 11/2019 | |
| CN | 111147211 A | 5/2020 | |
| WO | WO-2019074289 A1 * | 4/2011 | ............... H04B 7/06 |
| WO | 2019032696 A1 | 2/2019 | |
| WO | WO-2019049047 A1 * | 3/2019 | ........... H04B 7/0617 |
| WO | WO-2019154423 A1 * | 8/2019 | ......... H04B 7/06952 |
| WO | WO-2020017905 A1 * | 1/2020 | |
| WO | 2020097280 A1 | 5/2020 | |
| WO | WO-2021185461 A1 * | 9/2021 | ........... H04B 7/0456 |

OTHER PUBLICATIONS

Office Action and search report issued on Jul. 19, 2024 for Chinese Patent Application No. 202010599204.7 and its English translation provided by Applicant's Foreign Counsel.
CATT: "Beam Management for Control and Data Channel"; 3GPP TSG RAN WG1 AH_NR Meeting; R1-1700192; Jan. 10, 2017; Spokane, USA; Jan. 16-20, 2017.
International Search Report for PCT/CN2021/086622 issued on Jun. 22, 2021 and its English Translation provided by WIPO.
Written Opinion for PCT/CN2021/086622 issued on Jun. 22, 2021 and its English Translation provided by WIPO.
International Report on Patentibily for PCT/CN2021/086622 issued on Dec. 13, 2022 and its English translation provided by WIPO.

* cited by examiner

BEAM DETERMINATION APPARATUS, USER EQUIPMENT AND NETWORK DEVICE

CROSS-REFERENCE TO RELATED APPLICATIONS

This application is the U.S. national phase of PCT Application PCT/CN2021/086622 filed on Apr. 12, 2021, which claims the priority of Chinese Application No. 202010599204.7, filed on Jun. 28, 2020, the disclosures of which are incorporated in their entireties by reference herein.

TECHNICAL FIELD

The present disclosure relates to the field of communication technologies, and in particular to a beam determination apparatus, user equipment, and a network device.

BACKGROUND

In the new radio (NR) system, downlink channels include physical downlink shared channel (PDSCH) and physical downlink control channel (PDCCH); and uplink channels include physical uplink shared channel (PUSCH) and physical uplink control channel (PUCCH).

For high-frequency transmission (FR2 frequency range in the NR), due to the limited transmission range, the uplink and downlink channels are usually transmitted after beam-forming to enhance coverage. Directions of beam-formed beams may be determined by beam sweeping of uplink and downlink reference signals. For example, channel state information reference signals (CSI-RS) or sounding reference signals (SRS) in different directions are used for beam sweeping and a direction of a reference signal with the best beam quality may be selected for uplink or downlink transmission.

After beam directions of different channels are determined, signaling is required to indicate beams for channel transmission, that is, beam indication. For the PUCCH channel, a base station semi-statically configures multiple beam directions to user equipment through high-layer signaling SpatialRelationInfo, and instructs to activate one of them through a medium access control-control element (MAC-CE). For the PUSCH, uplink beams selected by the base station are indirectly indicated by SpatialRelationInfo of an SRS resource indicated by an SRS resource indicator (SRI) field in dynamic signaling downlink control information (DCI). For the PDCCH channel, the base station configures multiple transmission configuration indicator (TCI) states for each control resource set (CORESET) through high layer signaling, and instructs to activate one of them through MAC-CE. For the PDSCH channel, the base station uses the TCI field in the DCI signaling to indicate a TCI state which indicates a beam direction of the channel.

In the solution of the related art, different channels use different beam indication signaling, and beam indication for each channel is performed independently. In this way, different channels may be transmitted using respective different beams. However, an important scenario in practical applications is that multiple channels use the same beam direction; for example, PDCCH for resource scheduling and PDSCH for transmitting user data use the same beam direction for transmission; the uplink control channel PUCCH and the uplink data channel PUSCH may also use the same beam direction. In addition, when beam reciprocity exists, an uplink channel and a downlink channel may also use the same beam direction. At this point, the current independent beam indication method increases complexity of the system and signaling indication overhead.

SUMMARY

At least one embodiment of the present disclosure provides a beam determination apparatus, a UE and a network device, which can realize indication of common beam states and simultaneously indicate at least two channels and/or reference signals using the same beam, thereby reducing complexity of beam indication and overhead of indication signaling.

According to a first aspect, the present disclosure provides a beam determination method, performed by a user equipment (UE), including:
 determining, by the UE, whether a common beam state is a valid state; and
 in case that the common beam state is the valid state, determining, by the UE, that at least two channels and/or reference signals of the UE use the same beam for transmission.

In combination with the first aspect, in some implementations of the first aspect, the determining, by the UE, whether a common beam state is a valid state, includes at least one of the following:
 determining, by the UE, whether the common beam state is the valid state according to received common beam state indication information;
 determining, by the UE, whether the common beam state is the valid state according to preconfigured time during which the common beam state is the valid state; or,
 determining, by the UE, whether the common beam state is the valid state according to a preset event on the UE or a network device.

In combination with the first aspect, in some implementations of the first aspect, the common beam state indication information is used to indicate at least one of the following information: the common beam state is the valid state; a valid time during which the common beam state is the valid state; or, the common beam state is an invalid state.

In combination with the first aspect, in some implementations of the first aspect, he determining, by the UE, whether the common beam state is the valid state according to received common beam state indication information, includes:
 determining whether the common beam state is the valid state according to a value of a common beam state information field in the common beam state indication information; or,
 determining whether the common beam state is the valid state according to whether RNTI which successfully descrambles the common beam state indication information is a preset RNTI; or,
 determining whether the common beam state is the valid state according to whether a value of an existing information field in the common beam state indication information is a preset value; wherein the existing information field is a field used to indicate other information than the common beam state.

In combination with the first aspect, in some implementations of the first aspect, the common beam state indication information includes timer parameter indication information; and the timer parameter indication information is used to indicate the valid time during which the common beam state is the valid state.

In combination with the first aspect, in some implementations of the first aspect, the common beam state indication information further includes an offset time parameter; and the offset time parameter is used to indicate that the common beam state becomes valid after an offset time duration indicated by the offset time parameter passes.

In combination with the first aspect, in some implementations of the first aspect, the common beam state indication information is indicated by SIB 1, higher layer signaling or physical layer signaling.

In combination with the first aspect, in some implementations of the first aspect, the preset event includes at least one of UE beam sweeping, UE beam reporting, UE beam failure, base station beam sweeping, or base station beam indication.

In combination with the first aspect, in some implementations of the first aspect, the same beam is a beam used by a preset channel or a preset reference signal; or,
the same beam is a beam used by a channel or a reference signal indicated by physical layer signaling or high layer signaling; or,
the same beam is a beam indicated by physical layer signaling or high layer signaling.

In combination with the first aspect, in some implementations of the first aspect, the preset channel is one of PDCCH, PDSCH, PUCCH or PUSCH;
the preset reference signal is one of CSI-RS or SRS.

In combination with the first aspect, in some implementations of the first aspect, the at least two channels and/or reference signals includes at least two of PDCCH, PDSCH, PUCCH, PUSCH, CSI-RS or SRS.

In combination with the first aspect, in some implementations of the first aspect, the determining, by the UE, whether the common beam state is the valid state according to preconfigured time during which the common beam state is the valid state, includes:
according to a predefined time pattern for indicating whether the common beam state is valid or invalid, determining the valid time during which the common beam state is the valid state; and determining whether the common beam state is the valid state according to whether the current time is in the valid time duration.

According to a second aspect, the present disclosure provides a beam determination method, performed by a network device, including:
determining, by the network device, whether a common beam state of UE is a valid state;
when the common beam state of the UE is the valid state, determining, by the network device, that at least two channels and/or reference signals of the UE use the same beam for transmission.

In combination with the second aspect, in some implementations of the second aspect, the determining, by the network device, whether a common beam state of UE is a valid state, includes at least one of:
determining, by the network device, whether the common beam state of the UE is the valid state according to a common beam state configured by the network device itself for the UE;
determining, by the network device, whether the common beam state of the UE is the valid state according to preconfigured time during which the common beam state is the valid state; or,
determining, by the network device, whether the common beam state of the UE is the valid state according to a preset event on the UE/network side.

In combination with the second aspect, in some implementations of the second aspect, the method further includes:
sending, by the network device, to the UE, common beam state indication information for configuring the common beam state.

In combination with the second aspect, in some implementations of the second aspect, the common beam state indication information is used to indicate at least one of the following information:
the common beam state is the valid state;
a valid time during which the common beam state is the valid state; or,
the common beam state is an invalid state.

In combination with the second aspect, in some implementations of the second aspect, the sending, by the network device, to the UE, common beam state indication information for configuring the common beam state, includes:
sending, by the network device, the common beam state indication information carrying a common beam state information field, wherein different values of the common beam state information field are used to indicate whether the common beam state is the valid state; or,
sending, by the network device, the common beam state indication information scrambled by a preset RNTI, wherein there is a predefined mapping relationship between the preset RNTI and the common beam state; or,
sending, by the network device, the common beam state indication information carrying an existing information field, wherein the existing information field is a field used to indicate other information than the common beam state, and there is a predefined mapping relationship between preset values of the existing information field and the common beam state.

In combination with the second aspect, in some implementations of the second aspect, the common beam state indication information includes timer parameter indication information; and the timer parameter indication information is used to indicate the valid time during which the common beam state is the valid state.

In combination with the second aspect, in some implementations of the second aspect, the common beam state indication information further includes an offset time parameter; and the offset time parameter is used to indicate that the common beam state becomes valid after an offset time duration indicated by the offset time parameter passes.

In combination with the second aspect, in some implementations of the second aspect, the common beam state indication information is indicated by SIB 1, higher layer signaling or physical layer signaling.

In combination with the second aspect, in some implementations of the second aspect, the preset event includes at least one of UE beam sweeping, UE beam reporting, UE beam failure, base station beam sweeping, or base station beam indication.

In combination with the second aspect, in some implementations of the second aspect, the same beam is a beam used by a preset channel or a preset reference signal; or,
the same beam is a beam used by a channel or a reference signal indicated by physical layer signaling or high layer signaling; or,
the same beam is a beam indicated by physical layer signaling or high layer signaling.

In combination with the second aspect, in some implementations of the second aspect, the preset channel is one of PDCCH, PDSCH, PUCCH or PUSCH; the preset reference signal is one of CSI-RS or SRS.

In combination with the second aspect, in some implementations of the second aspect, the at least two channels and/or reference signals includes at least two of PDCCH, PDSCH, PUCCH, PUSCH, CSI-RS or SRS.

In combination with the second aspect, in some implementations of the second aspect, the determining, by the network device, whether the common beam state of the UE is the valid state according to preconfigured time during which the common beam state is the valid state, includes:

according to a predefined time pattern for indicating whether the common beam state is valid or invalid, determining, by the network device, the valid time during which the common beam state is the valid state; and determining whether the common beam state is the valid state according to whether the current time is in the valid time duration.

According to a third aspect, the present disclosure provides a beam determination apparatus, applied to a user equipment (UE), including:

a first determining module configured to determine whether a common beam state of the UE is a valid state;

a second determining module configured to, in case that the common beam state is the valid state, determine that at least two channels and/or reference signals of the UE use the same beam for transmission.

In combination with the third aspect, in some implementations of the third aspect, the first determining module is further configured to determine whether the common beam state of the UE is the valid state according to received common beam state indication information; and/or, determine whether the common beam state is the valid state according to preconfigured time during which the common beam state is a valid state.

According to a fourth aspect, the present disclosure provides a user equipment (UE), including: a memory, a processor, a transceiver, and a program stored on the memory and executable on the processor;

wherein the processor executes the program to perform the following steps:

determining whether a common beam state of the UE is a valid state;

in case that the common beam state is the valid state, determining that at least two channels and/or reference signals of the UE use the same beam for transmission.

In combination with the fourth aspect, in some implementations of the fourth aspect, the processor executes the program to perform the following steps:

determining whether the common beam state is the valid state according to received common beam state indication information; and/or, determining whether the common beam state is the valid state according to preconfigured time during which the common beam state is a valid state.

According to a fifth aspect, the present disclosure provides a beam determination apparatus, applied to a network device, including:

a first determination module configured to determine whether a common beam state of UE is a valid state;

a second determining module configured to, when the common beam state of the UE is the valid state, determine that at least two channels and/or reference signals of the UE use the same beam for transmission.

In combination with the fifth aspect, in some implementations of the fifth aspect, the first determination module is further configured to determine whether the common beam state of the UE is the valid state according to a common beam state configured by the network device itself for the UE; and/or, determine whether the common beam state of the UE is the valid state according to preconfigured time during which the common beam state is the valid state.

According to a sixth aspect, the present disclosure provides a network device, including: a memory, a processor, a transceiver, and a program stored on the memory and executable on the processor;

wherein the processor executes the program to perform the following steps:

determining whether a common beam state of UE is a valid state;

when the common beam state of the UE is the valid state, determining that at least two channels and/or reference signals of the UE use the same beam for transmission.

In combination with the sixth aspect, in some implementations of the sixth aspect, the processor executes the program to perform the following steps:

determining whether the common beam state of the UE is the valid state according to a common beam state configured by the network device for the UE; and/or, determining whether the common beam state of the UE is the valid state according to preconfigured time during which the common beam state is the valid state.

According to a seventh aspect, the present disclosure provides a computer storage medium, including instructions; wherein the instructions are executed on a computer to cause the computer to perform the above method.

The beneficial effects of the embodiments of the present disclosure are as follow.

According to the embodiments of the present disclosure, indication of the common beam state can be realized, and at least two channels and/or reference signals using the same beam can be indicated at the same time, thereby reducing complexity of beam indication and overhead of indication signaling. According to the embodiments of the present disclosure, when the common beam state is valid, multiple channels and/or reference signals use the same beam; and when the common beam state is invalid, the method of independently performing beam indication for different channels in the related art can be used, thereby implementing flexible switching of the UE between a common beam and an independent beam.

BRIEF DESCRIPTION OF THE DRAWINGS

A person of ordinary skill in the art would clearly understand various advantages and benefits of the embodiments of present disclosure by reading detail description of optional implementations set forth below. The drawings are only for the purpose of illustrating the optional implementations, rather than a limitation on the present disclosure. Same reference characters designate same parts throughout the drawings. In the drawings.

DETAILED DESCRIPTION

Figure 1:
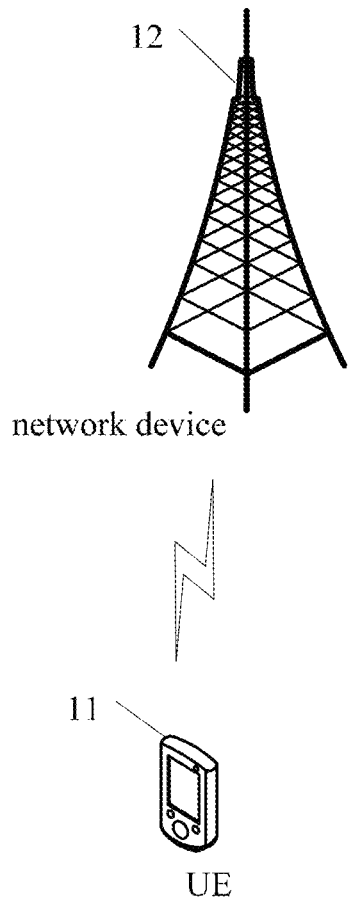
FIG. 1 is a schematic diagram of a wireless communication system applicable to an embodiment of the present disclosure.

Exemplary embodiments of the present disclosure will be described in details hereinafter with reference to the accompanying drawings. Although exemplary embodiments of the present disclosure are shown in the drawings, it is to be understood that the present disclosure may be embodied in various forms and should not be limited by the embodiments set forth herein. Rather, these embodiments are provided for more thorough understanding of the present disclosure and to fully convey the scope of the present disclosure to those skilled in the art.

The terms "first", "second" and the like in the specification and claims of the present disclosure are used to distinguish similar objects, and are not necessarily used to describe a specific order or sequence. It is to be understood that data so used are interchangeable under appropriate circumstances such that the embodiments of the present disclosure described herein are, for example, capable of practice in sequences other than those illustrated or described herein. Furthermore, the terms "including" and "having" as well as any variations thereof, are intended to cover a non-exclusive inclusion, for example, a process, method, system, product or device including a sequence of steps or units is not necessarily limited to the expressly listed steps or units, instead, may include other steps or units not explicitly listed or inherent to the process, method, product or device. The terms "and/or" in the specification and claims means at least one of connected objects.

The techniques described herein are not limited to the long time evolution (LTE) system, LTE-advanced (LTE-A) system, and 5G NR systems, and may also be used in other various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and new communication systems that will appear in the future. The terms "system" and "network" are often used interchangeably. The CDMA system may implement radio technologies such as CDMA2000, universal terrestrial radio access (UTRA). The UTRA includes wideband code division multiple access (WCDMA) and other CDMA variants. The TDMA system may implement radio technologies such as global system for mobile communication (GSM). The OFDMA system may implement radio technologies such as ultramobile broadband (UMB), Evolution-UTRA (E-UTRA), IEEE 802.21 (Wi-Fi), IEEE 802.16 (WiMAX), IEEE 802.20, Flash-OFDM. The UTRA and E-UTRA are parts of universal mobile telecommunications system (UMTS). LTE and LTE-advanced are new UMTS versions that use E-UTRA. UTRA, E-UTRA, UMTS, LTE, LTE-A and GSM are described in documents from an organization named "3rd generation partnership project" (3GPP). CDMA2000 and UMB are described in documents from an organization named "3rd generation partnership project 2" (3GPP2). The techniques described herein may be used for the systems and radio technologies mentioned above as well as other systems and radio technologies. However, the following description describes NR systems for the purpose of illustration, and NR terminologies are used in much of the following description, although the techniques are applicable to applications other than NR system.

The following description provides examples and does not limit the scope, applicability or configuration set forth in the claims. Changes may be made in functions and arrangements of discussed elements without departing from the spirit and scope of the present disclosure. Various examples may omit, substitute, or add various procedures or components as appropriate. For example, the described methods may be performed in an order different from that described, and various steps may be added, omitted, or combined. Additionally, features described with reference to certain examples may be combined in other examples.

Referring to FIG. 1, FIG. 1, FIG. 1 is a schematic diagram of a wireless communication system applicable to an embodiment of the present disclosure. The wireless communication system includes a terminal 11 and a network device 12. The terminal 11 may also be referred to as user terminal or user equipment (UE). The terminal 11 may be a mobile phone, a tablet personal computer, a laptop computer, a personal digital assistant (PDA), a mobile internet device (MID), a wearable device or vehicle-mounted device and other terminal-side devices. It is to be noted that, in the embodiments of the present disclosure, the specific type of the terminal 11 is not limited. The network device 12 may be a base station and/or a core network element. The base station may be a base station (i.e., gNB, 5G NR NB, etc.) of 5G and later versions, or a base station (i.e., eNB, WLAN access point, or other access point, etc.) in other communication systems. The base station may be referred to as a Node B, an evolved Node B, an access point, a base transceiver station (BTS), a radio base station, a radio transceiver, a basic service set (BSS), an extended service set (ESS), Node B, evolved node B (eNB), home node B, home evolved node B, WLAN access point, WiFi node or any other suitable term in the field. As long as the same technical effect is achieved, the base station is not limited to a specific technical vocabulary. It is to be noted that in the embodiments of the present disclosure, the base station in the NR system is only used as an example, but the specific type of the base station is not limited.

The base stations may communicate with the terminal 11 under the control of a base station controller. In various examples, the base station controller may be part of a core network or some base station. Some base stations may communicate control information or user data with the core network through the backhaul. In some examples, some of these base stations may communicate with each other directly or indirectly via backhaul links, which may be wired or wireless communication links. The wireless communication system may support operation on multiple carriers (waveform signals of different frequencies). A multi-carrier transmitter can transmit modulated signals on these multiple carriers simultaneously. For example, each communication link may be a multi-carrier signal modulated according to various radio technologies. Each modulated signal may be sent on different carriers and may carry control information (i.e., reference signals, control channels, etc.), overhead information, data, and the like.

The base station may communicate wirelessly with the terminal 11 via one or more access point antennas. Each base station can provide communication coverage for its respective coverage area. A coverage area of an access point may be divided into sectors that make up only a portion of the coverage area. The wireless communication system may include base stations of different types (i.e., macro base stations, micro base stations, or pico base stations). The base stations may also utilize different radio technologies, such as cellular or WLAN radio access technologies. The base stations may be associated with the same or different access networks or operator deployments. The coverage areas of different base stations (including coverage areas of base stations of the same or different types, coverage areas utilizing the same or different radio technologies, or coverage areas belonging to the same or different access networks) may overlap.

Communication links in the wireless communication system may include an uplink link for carrying uplink (UL) transmissions (i.e., from the terminal 11 to the network device 12), and a downlink link for carrying downlink (DL) transmissions (i.e., from the network device 12 to the terminal 11). UL transmissions may also be referred to as reverse link transmissions, and DL transmissions may also be referred to as forward link transmissions. The DL transmissions may be carried out in licensed frequency bands, unlicensed frequency bands or both. Similarly, the uplink transmission may be carried out in licensed frequency bands, unlicensed frequency bands or both.

Figure 2:
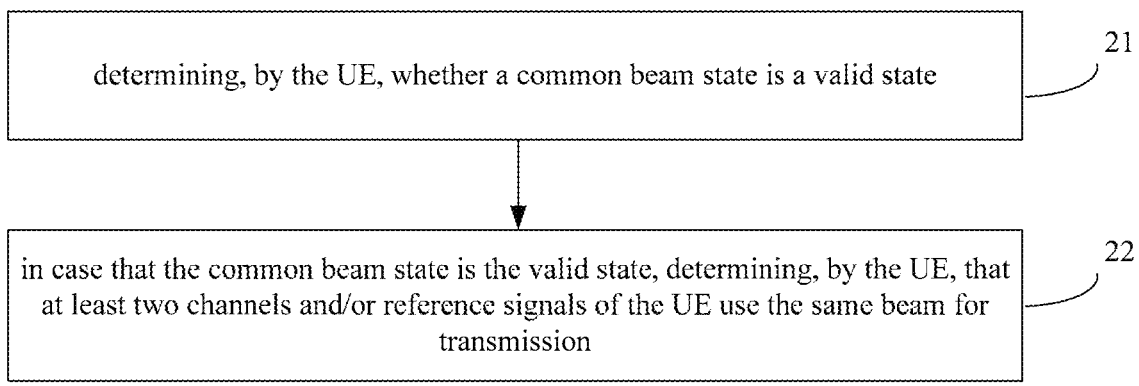
FIG. 2 is a flowchart of a beam determination method according to an embodiment of the present disclosure.

One embodiment of the present disclosure provides a beam determination method. As shown in FIG. 2, when the method is performed by a user equipment (UE), the method includes:

Step 21: determining, by the UE, whether a common beam state is a valid state.

The embodiment of the present disclosure introduces the common beam state. In case that the common beam state of the UE is a valid state, at least two channels and/or reference signals of the UE will use the same beam for transmission. In case that the common beam state of the UE is an invalid state, the method of independently performing beam indication for different channels in the related art can be used.

Specifically, the common beam state may be controlled by a network device such as a base station, or may be determined according to a valid time duration pre-agreed between the UE and the network device. For example, the UE may determine whether the common beam state is the valid state according to received common beam state indication information. For another example, the UE may determine whether the common beam state is the valid state according to preconfigured time during which the common beam state is the valid state.

In case that the common beam state indication information is used to control whether the common beam state of the UE is valid, the common beam state indication information may be indicated through system information block 1 (SIB 1), high layer signaling or physical layer signaling. The high layer signaling includes radio resource control (RRC) signaling, etc. The physical layer signaling may be various DCIs and the like. The common beam state indication information is used to indicate at least one of the following information:

1) The common beam state is a valid state.

In case that the common beam state of the UE is the valid state, at least two channels and/or reference signals of the UE will use the same beam for transmission.

2) A valid time during which the common beam state is a valid state.

Here, the common beam state indication information may include timer parameter indication information. The timer parameter indication information is used to indicate the valid time during which the common beam state is the valid state.

Moreover, the common beam state indication information may further include an offset time parameter. The offset time parameter is used to indicate that the common beam state becomes valid after an offset time duration indicated by the offset time parameter passes. The offset time duration is offset on the basis of a certain reference time. The reference time may specifically be a predefined time or a reception time of the common beam state indication information.

3) The common beam state is an invalid state.

In case that the common beam state of the UE is the invalid state, the method of independently performing beam indication for different channels in the related art can be used to indicate beams of each channel/reference signal.

As an implementation manner, according to one embodiment of the present disclosure, a dedicated common beam state information field can be defined in the common beam state indication information to indicate the common beam state. In this way, the UE can determine whether the common beam state is a valid state according to a value of the common beam state information field in the common beam state indication information. For example, when the value of the common beam state information field is 1, it means that the common beam state is the valid state; when the value of the common beam state information field is 0, it means that the common beam state is the invalid state.

As another implementation manner, according to one embodiment of the present disclosure, the common beam state may be indicated in an implicit manner. For example, a first radio network temporary identifier (RNTI) corresponding to a valid common beam state and a second RNTI corresponding to an invalid common beam state are predefined. When indicating that the common beam state of the UE is valid, the network device sends the common beam state indication information scrambled by the first RNTI; when indicating that the common beam state of the UE is invalid, the network device sends the common beam state indication information scrambled by the second RNTI. In this way, the UE can determine whether the common beam state is the valid state according to whether RNTI which successfully descrambles the common beam state indication information is a preset RNTI. For example, when RNTI which successfully descrambles the common beam state indication information is the first RNTI, it is determined that the common beam state indicated at this time is a valid state; when the RNTI which successfully descrambles the common beam state indication information is the second RNTI, it is determined that the common beam state indicated at this time is an invalid state.

As another implementation manner, according to one embodiment of the present disclosure, the common beam state may be indicated by using some fields (herein referred to as an existing information field) used in the related art to indicate information other than the common beam state. This/these existing information fields are pre-defined fields originally used to indicate other information, and values of these fields usually have some reserved values, and these reserved values are not used to indicate the above other information. Therefore, in one embodiment of the present disclosure, the reserved values of one/some existing information fields may be used to indicate the common beam state. For example, it is determined whether the common beam state is a valid state according to whether a value of the existing information field in the common beam state indication information is a preset value.

In case that preconfigured time during which the common beam state is a valid state, is used to indicate whether the common beam state of the UE is valid, the UE may determine a valid time during which the common beam state is valid, according to a predefined time pattern for indicating that the common beam state is valid or invalid; and determine whether the common beam state is the valid state according to whether the current time is in the valid time duration. The time pattern may be predefined by the system, for example, a time pattern that has been pre-configured on both the network device and the UE. Alternatively, the time pattern may be configured by the network device for the UE through high-layer signaling or physical layer signaling.

In addition, the common beam state may also be determined according to a preset event on the UE or the network device. The preset event is an event predefined in the communication system including the UE and the network device. For example, the preset event may specifically be at least one of UE beam sweeping, UE beam reporting, UE beam failure, base station beam sweeping, or base station beam indication. The event of UE beam sweeping may specifically be that the UE starts beam sweeping, the UE ends beam sweeping, etc., which is not specifically limited in the present disclosure. The UE beam reporting is an event of reporting a beam sweeping result to the network. The UE beam failure is an event in which a beam failure occurs on the UE. The base station beam sweeping is a beam sweeping event of the base station for the UE, which may specifically be the start of sweeping or the end of sweeping. The event of base station beam indication is that the base station performs beam indication to the UE.

Step 22: in case that the common beam state is the valid state, determining, by the UE, that at least two channels and/or reference signals of the UE use the same beam for transmission.

Here, the same beam may be a beam used by a preset channel or a preset reference signal, a beam used by a channel indicated by physical layer signaling or high layer signaling, a beam used by a reference signal indicated by physical layer signaling or high layer signaling, or, a beam indicated by physical layer signaling or high layer signaling. The preset channel is one of PDCCH, PDSCH, PUCCH or PUSCH. The preset reference signal is one of CSI-RS or SRS. The using the same beam for transmission, includes: using the same beam for sending and/or receiving. When the same beam is a sending beam, the same beam is used to receive refers to receiving in a direction of the sending beam; when the same beam is a receiving beam, the same beam is used to send refers to sending in a direction of the receiving beam.

In case that the common beam state is valid, at least two channels and/or reference signals of the UE use the same beam, here, the at least two channels and/or reference signals are at least two of PDCCH, PDSCH, PUCCH, PUSCH, CSI-RS or SRS. For example, the at least two channels and/or reference signals may be PDCCH and PDSCH; or, the at least two channels and/or reference signals may be PDCCH, PDSCH and CSI-RS; or, the at least two channels and/or the reference signals may be PUCCH and PUSCH; or, the at least two channels and/or reference signals may be PUCCH, PUSCH and SRS; or, the at least two channels and/or reference signals may be PDCCH and PUCCH, and so on, which will not be listed here one by one.

In case that the common beam state is the invalid state, independent beam indication in the related art can be adopted, which will not be repeated here.

Through the above steps, according to the embodiments of the present disclosure, indication of the common beam state can be realized, and at least two channels and/or reference signals using the same beam can be indicated at the same time. Since the beams of multiple channels/reference signals can be indicated at the same time, compared with the independent indication method in the related art, the embodiment of the present disclosure can reduce complexity of beam indication and overhead of indication signaling. In addition, after adopting the method of the embodiment of the present disclosure, the common beam state can be used to implement flexible switching of the UE between a common beam and an independent beam. The common beam means that at least two channels and/or reference signals are transmitted using the same beam.

After the above step 22, the UE may use the same beam to receive or send the at least two channels and/or reference signals.

For example, in case that the same beam is a sending beam, when sending a first channel or a first reference signal of the at least two channels and/or reference signals, the sending beam may be used to send the first channel or the first reference signal; when receiving a second channel or a second reference signal of the at least two channels and/or reference signals, the second channel or the second reference signal may be received in a direction of the sending beam.

Similarly, in case that the same beam is a receiving beam, when sending the first channel or the first reference signal of the at least two channels and/or reference signals, the first channel or the first reference signal may be sent in a direction of the receiving beam; when receiving a second channel or a second reference signal of the at least two channels and/or reference signals, the second channel or the second reference signal may be received using the receiving beam.

Figure 3:
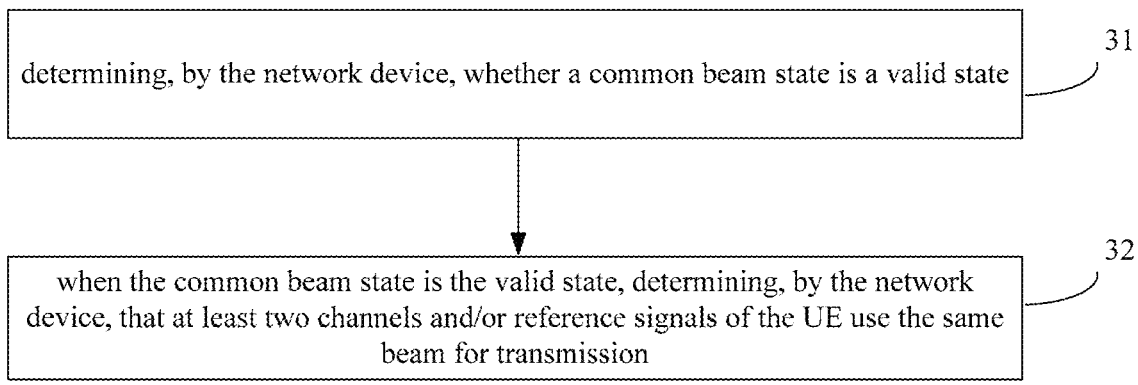
FIG. 3 is another flowchart of a beam determination method according to an embodiment of the present disclosure.

At least one implementation manner of the beam determination method of the present disclosure has been introduced from the UE side. Referring to FIG. 3, a beam determination method is provided according to one embodiment of the present disclosure, and is performed by a network device such as a base station. The method includes:

Step 31: determining, by the network device, whether a common beam state of UE is a valid state.

Here, the determining, by the network device, whether a common beam state of UE is a valid state, may specifically include at least one of the following:

1) the network device may determine whether the common beam state of the UE is the valid state according to a common beam state configured by the network device itself for the UE;

2) the network device determines whether the common beam state of the UE is the valid state according to preconfigured time during which the common beam state is the valid state.

When determining whether the common beam state of the UE is the valid state according to the preconfigured time during which the common beam state is the valid state, the network device may determine a valid time during which the common beam state is the valid state, according to a predefined time pattern for indicating whether the common beam state is valid or invalid; and determine whether the common beam state is valid according to whether the current time is in the valid time duration.

3) The network device determines whether the common beam state is the valid state according to a preset event on the UE/network side.

Here, the preset event includes at least one of UE beam sweeping, UE beam reporting, UE beam failure, base station beam sweeping, or base station beam indication.

Step 32: when the common beam state of the UE is the valid state, determining, by the network device, that at least two channels and/or reference signals of the UE use the same beam for transmission.

Here, the same beam may be a beam used by a preset channel or a preset reference signal, a beam used by a channel indicated by physical layer signaling or high layer signaling, a beam used by a reference signal indicated by physical layer signaling or high layer signaling, or, a beam indicated by physical layer signaling or high layer signaling. The preset channel is one of PDCCH, PDSCH, PUCCH or PUSCH. The preset reference signal is one of CSI-RS or SRS. The using the same beam for transmission, includes: using the same beam for sending and/or receiving. When the same beam is a sending beam, the same beam is used to receive refers to receiving in a direction of the sending beam; when the same beam is a receiving beam, the same beam is used to send refers to sending in a direction of the receiving beam.

Through the above steps, according to the embodiments of the present disclosure, the network device can determine the common beam state of the UE, and then perform transmission of a corresponding channel and/or a reference channel according to the determined state, where the transmission includes sending and/or receiving. Since the common beam state capable of simultaneously indicating a beam for multiple channel/reference signals is introduced, the embodiments of the present disclosure can reduce complexity of beam indication and overhead of indication signaling. In addition, in the embodiments of the present disclosure, when the common beam state is valid, multiple channels and/or reference signals use the same beam; and when the common beam state is invalid, the method of independently performing beam indication for different channels in the related art can be used, thereby implementing flexible switching of the UE between a common beam and an independent beam.

After the above step 33, according to the common beam state configured by the network device itself for the UE, the network device may further send, to the UE, common beam state indication information for configuring the common beam state. The common beam state indication information may be indicated by SIB 1, higher layer signaling or physical layer signaling.

Similarly, the common beam state indication information may be used to indicate at least one of the following information:

1) The common beam state is a valid state.

2) A valid time during which the common beam state is a valid state.

Here, the common beam state indication information may include timer parameter indication information. The timer parameter indication information is used to indicate the valid time during which the common beam state is the valid state. Moreover, the common beam state indication information may further include an offset time parameter. The offset time parameter is used to indicate that the common beam state becomes valid after an offset time duration indicated by the offset time parameter passes.

3) The common beam state is an invalid state.

Various implementations for sending the common beam state indication information are provided below, for example:

a) The network device sends common beam state indication information carrying a common beam state information field, where different values of the common beam state information field are used to indicate whether the common beam state is a valid state.

b) The network device sends common beam state indication information scrambled by a preset RNTI, where there is a predefined mapping relationship between the preset RNTI and the common beam state.

c) The network device sends common beam state indication information carrying an existing information field, where the existing information field is a field used to indicate other information than the common beam state, and there is a predefined mapping relationship between preset values of the existing information field and the common beam state.

The implementation of the beam determination method on both the UE and the network device according to the embodiments of the present disclosure are described hereinafter. Several examples of applying the beam determination method according to the embodiments of the present disclosure are further provided hereinafter in conjunction with the accompanying drawings.

Example 1

The base station sends a common beam state indication signaling. The indication signaling is configured through RRC signaling, and the signaling includes timer parameters, as follows:

Common_beam state
{
Duration
Timer
TimeOffset
}

Where the parameter DurationTimer indicates a valid time duration of the common beam state (used to indicate the duration); and TimeOffset indicates offset time of the common beam state (used to determine start time). In the NR system, MAC-CE or dynamic signaling is used to trigger the common beam state. For example, when using UE group Common DCI for triggering the common beam state, the UE determines that the valid time duration of the common beam state starts from a moment of "receiving DCI"+TimeOffset until DCI+TimeOffset+DurationTimer. Here, "receiving DCI" represents a reception time when the UE group Common DCI is received.

Meanwhile, the system pre-defines that during the valid time duration of the common beam state, all uplink and downlink channels (i.e., PDCCH, PDSCH, PUSCH and PUCCH) use a beam used by CORESET with the smallest ID for transmission. That is, all uplink and downlink channels use a beam of the PDCCH channel for transmission. For example, the MAC-CE activates TCI state 3 as a beam used by the CORESET with the smallest ID, that is, the PDCCH is transmitted through a beam corresponding to the TCI state 3. In this way, in a time range from a moment of receiving DCI+TimeOffset to a moment of receiving DCI+TimeOffset+Duration Timer, PDCCH, PDSCH, PUSCH and PUCCH all are transmitted through a beam corresponding to the TCI state 3.

In addition, the system may pre-define that all uplink and downlink channels use a beam used by one of the UE-specific DCI, such as DCI format 0_1, for transmission.

Example 2

The base station sends a common beam state indication signaling. The indication signaling is configured through RRC signaling, and the signaling includes timer parameters, as follows:

```
Common_beam_state
{
Duration Timer
TimeOffset
Period
}
```

Where the parameter DurationTimer indicates a valid time duration of the common beam state (the duration); and TimeOffset indicates start offset time of the common beam state; the parameter period represents a period of the common beam state.

The system pre-defines that a starting time of SFN0 is taken as a starting reference point of the common beam state. In this way, according to the above configuration, the UE determines that SFN0+TimeOffset is a starting time of the common beam state, and a first period ends at SFN0+TimeOffset+DurationTimer.

A second period of the common beam state is from SFN0+TimeOffset+Period to SFN0+TimeOffset+Period+DurationTimer, and so on.

During the valid time duration of each common beam state, similar to Example 1, the system pre-defines that all the uplink and downlink channels uses a beam of the PDCCH channel for transmission, which will not be repeated here.

Example 3

A base station uses a UE-group common DCI to indicate whether a common beam state of UE is valid. For example, DCI format 2-7 is defined and includes a common beam state indication field. In case that indication in the indication field is 'ON', it means that the common beam state becomes valid; in case that indication in the indication field is 'OFF', it means that the common beam state is invalid. The UE determines a current state according to a received DCI.

Or, the base station side uses a UE-specific DCI, such as DCI format 0-0, DCI format 0-1, DCI format 1-0, DCI format 1-1, to indicate whether the common beam state of the UE is valid. The system pre-defines that when part or all of information fields in a DCI are a first special value, it indicates that the common beam state is valid. The system pre-defines that when part or all of information fields in a DCI are a second special value, it indicates that the common beam state is invalid.

For example, the system pre-defines that when values in a frequency domain resource allocation field and a time domain resource allocation field in a DCI format1-1 are all 0, it indicates that the common beam state is valid; when values in the frequency domain resource allocation field and the time domain resource allocation field in the DCI format1-1 are all 1, it indicates that the common beam state is invalid. The UE determines a current state according to a received UE-specific DCI.

Or, the base station uses a UE-group common DCI to indicate whether a common beam state of the UE is valid. The UE-group common DCI is scrambled by different RNTIs to indicate whether the common beam state becomes valid. For example, the system predefines Common-beam-RNTI1 and Common-beam-RNTI2. After DCI format 1-0 is scrambled by Common-beam-RNTI1, it indicates that the common beam state is valid; after DCI format 1-0 is scrambled by Common-beam-RNTI2, it indicates that the common beam state is invalid. The UE determines a current state according to a received UE-specific DCI.

Example 4

The system pre-defines that after base station completes downlink beam sweeping, the common beam state becomes valid. For example, the base station triggers transmission of aperiodic CSI-RS, and requires the UE to report a CSI-RS resource index (CRI). After the UE completes measurement of the aperiodic CSI-RS and reports the CRI, the common beam state becomes valid for the UE and the base station.

During the valid time duration of each common beam state, similar to Example 1, the system pre-defines that all the uplink and downlink channels uses a beam of the PDCCH channel for transmission, which will not be repeated here.

Whether the common beam state is invalid may be determined through a timer configured via high layer signaling or physical layer signaling, as shown in Example 1. Or, whether the common beam state is invalid may be determined by an event predefined by the system. For example, the system pre-defines that when the base station performs beam indication, the common beam state becomes invalid; it may be that after the base station indicates a beam direction of an uplink PUSCH through DCI format 0_1, the common beam state becomes invalid.

Various methods of embodiments of the present disclosure have been described above. Apparatus for carrying out the above method will be further provided hereinafter.

Figure 4:
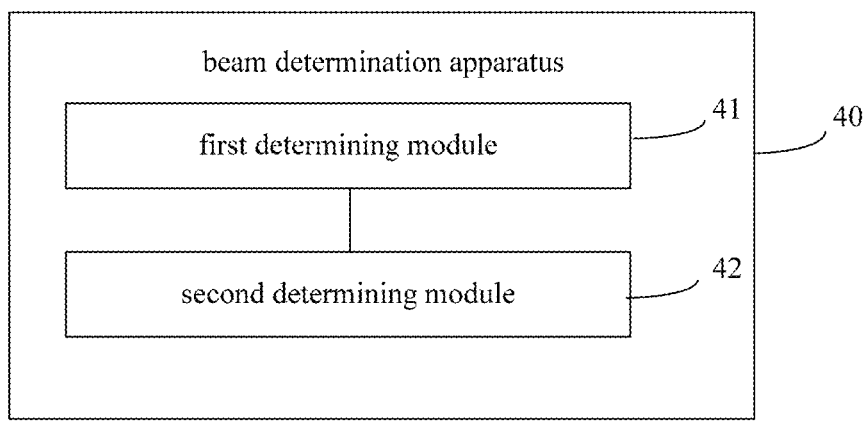
FIG. 4 is a schematic diagram of a beam determination apparatus according to an embodiment of the present disclosure.

Referring to FIG. 4, one embodiment of the present disclosure provides a beam determination apparatus 40 which may be applied to a UE. As shown in FIG. 4, the beam determination apparatus 40 includes:
  a first determining module 41 configured to determine whether a common beam state of the UE is a valid state;
  a second determining module 42 configured to, in case that the common beam state is the valid state, determine that at least two channels and/or reference signals of the UE use the same beam for transmission.

Optionally, the first determining module is further configured to determine whether the common beam state of the UE is the valid state according to at least one of the following manners:
  determining whether the common beam state is the valid state according to received common beam state indication information;
  determining whether the common beam state is the valid state according to preconfigured time during which the common beam state is a valid state; or,
  determining whether the common beam state is the valid state according to a preset event on the UE or the network device.

Whether the common beam state is the valid state may be determined according to received common beam state indication information; and/or, whether the common beam state is the valid state may be determined according to preconfigured time during which the common beam state is a valid state.

Optionally, the common beam state indication information is used to indicate at least one of the following information:
  the common beam state is a valid state;
  a valid time during which the common beam state is a valid state; or,
  the common beam state is an invalid state.

Optionally, the first determining module is further configured to:
  determine whether the common beam state is the valid state according to a value of a common beam state information field in the common beam state indication information; or,
  determine whether the common beam state is the valid state according to whether RNTI which successfully descrambles the common beam state indication information is a preset RNTI; or, determine whether the common beam state is the valid state according to whether a value of an existing information field in the common beam state indication information is a preset value; where the existing information field is a field used to indicate other information than the common beam state.

Optionally, the common beam state indication information includes timer parameter indication information. The timer parameter indication information is used to indicate a valid time during which the common beam state is the valid state.

Optionally, the common beam state indication information further includes an offset time parameter. The offset time parameter is used to indicate that the common beam state becomes valid after an offset time duration indicated by the offset time parameter passes.

Optionally, the common beam state indication information may be indicated by SIB 1, higher layer signaling or physical layer signaling.

Optionally, the preset event includes at least one of UE beam sweeping, UE beam reporting, UE beam failure, base station beam sweeping, or base station beam indication.

Optionally, the same beam is a beam used by a preset channel or a preset reference signal; or, the same beam is a beam used by a channel or a reference signal indicated by physical layer signaling or high layer signaling; or, the same beam is a beam indicated by physical layer signaling or high layer signaling.

Optionally, the preset channel is one of PDCCH, PDSCH, PUCCH or PUSCH.

The preset reference signal is one of CSI-RS or SRS.

Optionally, the at least two channels and/or reference signals includes at least two of PDCCH, PDSCH, PUCCH, PUSCH, CSI-RS or SRS.

Optionally, the first determining module is further configured to, according to a predefined time pattern for indicating whether the common beam state is valid or invalid, determine a valid time during which the common beam state is the valid state; and determine whether the common beam state is valid according to whether the current time is in the valid time duration.

It is to be noted that the apparatus in this embodiment is an apparatus corresponding to the above method shown in FIG. 2, and the implementation manners in the above embodiments are all applicable to the embodiments of the apparatus, and the same technical effect can also be achieved. The above apparatus provided in the embodiment of the present disclosure can realize all steps of the above method embodiment, and can achieve the same technical effect. Parts and beneficial effects in this embodiment that are the same as those in the method embodiment will not be described in detail here.

Figure 5:
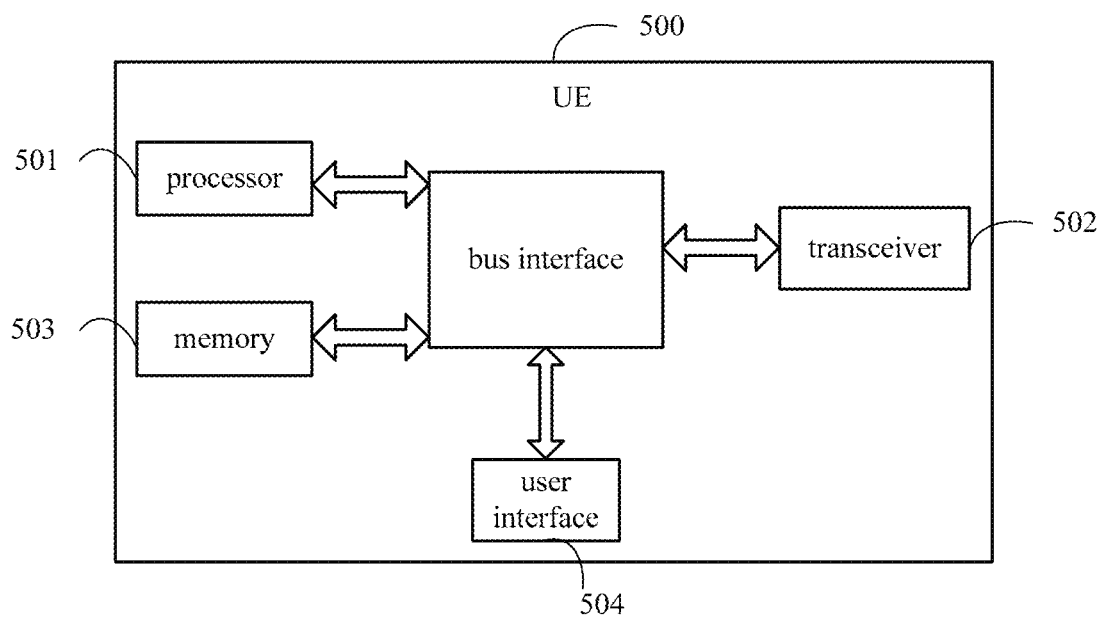
FIG. 5 is a schematic diagram of a user equipment according to an embodiment of the present disclosure.

Referring to FIG. 5, it is a schematic diagram of a user equipment (UE) according to an embodiment of the present disclosure. The UE 500 includes a processor 501, a transceiver 502, a memory 503, a user interface 504 and a bus interface.

In the embodiment of the present disclosure, the UE 500 further includes: a program stored on the memory 503 and executable on the processor 501.

The processor 501 executes the program to perform the following steps:

determining whether a common beam state of the UE is a valid state;

in case that the common beam state is the valid state, determining that at least two channels and/or reference signals of the UE use the same beam for transmission.

Optionally, the processor executes the program to further perform the following steps:

determining whether the common beam state of the UE is the valid state according to at least one of the following manners:

determining whether the common beam state is the valid state according to received common beam state indication information;

determining whether the common beam state is the valid state according to preconfigured time during which the common beam state is a valid state; or, determining whether the common beam state is the valid state according to a preset event on the UE or the network device.

Optionally, the common beam state indication information is used to indicate at least one of the following information:

the common beam state is a valid state;

a valid time during which the common beam state is a valid state; or, the common beam state is an invalid state.

Optionally, the processor executes the program to further perform the following steps:

determining whether the common beam state is the valid state according to a value of a common beam state information field in the common beam state indication information; or, determining whether the common beam state is the valid state according to whether RNTI which successfully descrambles the common beam state indication information is a preset RNTI; or, determining whether the common beam state is the valid state according to whether a value of an existing information field in the common beam state indication information is a preset value; where the existing information field is a field used to indicate other information than the common beam state.

Optionally, the common beam state indication information includes timer parameter indication information. The timer parameter indication information is used to indicate a valid time during which the common beam state is the valid state.

Optionally, the common beam state indication information further includes an offset time parameter. The offset time parameter is used to indicate that the common beam state becomes valid after an offset time duration indicated by the offset time parameter passes.

Optionally, the common beam state indication information may be indicated by SIB 1, higher layer signaling or physical layer signaling.

Optionally, the preset event includes at least one of UE beam sweeping, UE beam reporting, UE beam failure, base station beam sweeping, or base station beam indication.

Optionally, the same beam is a beam used by a preset channel or a preset reference signal; or, the same beam is a beam used by a channel indicated by physical layer signaling or high layer signaling; or, the same beam is a beam indicated by physical layer signaling or high layer signaling.

Optionally, the preset channel is one of PDCCH, PDSCH, PUCCH or PUSCH.

The preset reference signal is one of CSI-RS or SRS.

Optionally, the at least two channels and/or reference signals includes at least two of PDCCH, PDSCH, PUCCH, PUSCH, CSI-RS or SRS.

Optionally, the processor executes the program to further perform the following steps:

according to a predefined time pattern for indicating whether the common beam state is valid or invalid, determining a valid time during which the common beam state is the valid state; and determining whether the common beam state is valid according to whether the current time is in the valid time duration.

In FIG. 5, a bus architecture may include any number of interconnected bus and bridge. Specifically, various circuits of one or more processors, which are represented by the processor 501, and one or more memories, which are represented by the memory 503, are linked together. The bus architecture may link various other circuits, such as a peripheral device, voltage regulator and a power management circuit together. These features are well known in this field; therefore, this disclosure does not make further description on these features. The bus interface provides an interface. The transceiver 502 may be multiple elements, including a transmitter and a receiver and provide units, which communicate with other devices on the transmission medium. For different terminals, the user interface 504 may also be an interface capable of externally connecting required devices, and the connected devices include but are not limited to keypads, displays, speakers, microphones, joysticks, etc.

The processor 501 is responsible for managing the bus architecture and the normal processing. The memory 503 may be used to store data used by the processor 501 for performing operations.

It is to be noted that the UE in this embodiment is UE corresponding to the above method shown in FIG. 2, and the implementation manners in the above embodiments are all applicable to the embodiments of the UE, and the same technical effect can also be achieved. In the UE, the transceiver 502 and the memory 503, and the transceiver 502 and the processor 501, may be connected through the bus interface. Functions of the processor 501 may also be realized by the transceiver 502, and functions of the transceiver 502 may also be realized by the processor 501. It is to be noted that the above UE provided in the embodiment of the present disclosure can realize all steps of the above method embodiment, and can achieve the same technical effect. Parts and beneficial effects in this embodiment that are the same as those in the method embodiment will not be described in detail here.

In some embodiments of the present disclosure, a computer-readable storage medium is provided and includes a program stored thereon. The program is executed by a processor to perform the following steps:

determining whether a common beam state of the UE is a valid state;

in case that the common beam state is the valid state, determining that at least two channels and/or reference signals of the UE use the same beam for transmission.

When the program is executed by the processor, all the implementation manners in the above beam determination method performed by the UE can be implemented, and the same technical effect can be achieved. To avoid repetition, details are not described here.

Figure 6:
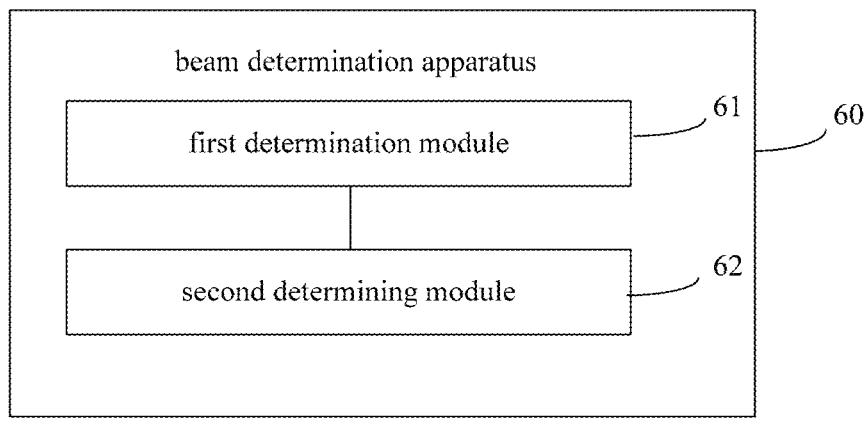
FIG. 6 is another schematic diagram of a beam determination apparatus according to an embodiment of the present disclosure.

One embodiment of the present disclosure provides a beam determination apparatus shown in FIG. 6, which may be applied to a network device. Referring to FIG. 6, the beam determination apparatus 60 includes:

a first determination module 61 configured to determine whether a common beam state of UE is a valid state;

a second determining module 62 configured to, when the common beam state of the UE is the valid state, determine that at least two channels and/or reference signals of the UE use the same beam for transmission.

Optionally, the first determination module is further configured to determine whether the common beam state of UE is the valid state according to at least one of the following manners:

determining whether the common beam state of the UE is the valid state according to a common beam state configured by the network device for the UE;

determining whether the common beam state of the UE is the valid state according to preconfigured time during which the common beam state is the valid state; or, determining whether the common beam state is the valid state according to a preset event on the UE/network side.

Optionally, the beam determination apparatus further includes:

a sending module configured to send, to the UE, common beam state indication information for configuring the common beam state.

Optionally, the common beam state indication information is used to indicate at least one of the following information:

the common beam state is a valid state;

a valid time during which the common beam state is a valid state; or, the common beam state is an invalid state.

Optionally, the sending module is further configured to:

send common beam state indication information carrying a common beam state information field, where different values of the common beam state information field are used to indicate whether the common beam state is a valid state; or, send common beam state indication information scrambled by a preset RNTI, where there is a predefined mapping relationship between the preset RNTI and the common beam state; or, send common beam state indication information carrying an existing information field, where the existing information field is a field used to indicate other information than the common beam state, and there is a predefined mapping relationship between preset values of the existing information field and the common beam state.

Optionally, the common beam state indication information includes timer parameter indication information. The timer parameter indication information is used to indicate the valid time during which the common beam state is the valid state.

Optionally, the common beam state indication information may further include an offset time parameter. The offset time parameter is used to indicate that the common beam state becomes valid after an offset time duration indicated by the offset time parameter passes.

Optionally, the common beam state indication information may be indicated by SIB 1, higher layer signaling or physical layer signaling.

Optionally, the same beam is a beam used by a preset channel or a preset reference signal; or, the same beam is a beam used by a channel indicated by physical layer signaling or high layer signaling; or, the same beam is a beam indicated by physical layer signaling or high layer signaling.

Optionally, the preset channel is one of PDCCH, PDSCH, PUCCH or PUSCH.

The preset reference signal is one of CSI-RS or SRS.

Optionally, the at least two channels and/or reference signals includes at least two of PDCCH, PDSCH, PUCCH, PUSCH, CSI-RS or SRS.

Optionally, the first determining module is further configured to, according to a predefined time pattern for indicating whether the common beam state is valid or invalid, determine a valid time during which the common beam state is the valid state; and determine whether the common beam state is valid according to whether the current time is in the valid time duration.

It is to be noted that the apparatus in this embodiment is an apparatus corresponding to the above method shown in FIG. 3, and the implementation manners in the above embodiments are all applicable to the embodiments of the apparatus, and the same technical effect can also be achieved. It is to be noted that the above apparatus provided in the embodiment of the present disclosure can realize all steps of the above method embodiment, and can achieve the same technical effect. Parts and beneficial effects in this embodiment that are the same as those in the method embodiment will not be described in detail here.

Figure 7:
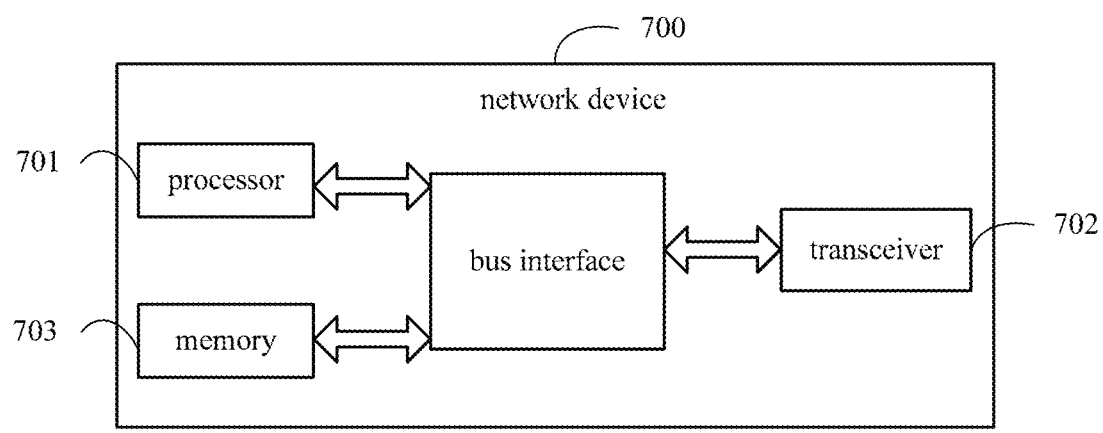
FIG. 7 is a schematic diagram of a network device according to an embodiment of the present disclosure.

Referring to FIG. 7, it is a schematic diagram of a network device 700 according to an embodiment of the present disclosure. The network device 700 includes a processor 701, a transceiver 7502, a memory 703 and a bus interface.

In the embodiment of the present disclosure, the network device 700 further includes: a program stored on the memory 703 and executable on the processor 701. The processor 701 executes the program to perform the following steps:

determining whether a common beam state of UE is a valid state;

when the common beam state of the UE is the valid state, determining that at least two channels and/or reference signals of the UE use the same beam for transmission.

Optionally, the processor executes the program to perform the following steps:

determining whether the common beam state of UE is the valid state according to at least one of the following manners:

determining whether the common beam state of the UE is the valid state according to a common beam state configured by the network device for the UE;

determining whether the common beam state of the UE is the valid state according to preconfigured time during which the common beam state is the valid state; or, determining whether the common beam state is the valid state according to a preset event on the UE/network side.

Optionally, the processor executes the program to perform the following steps:

sending, to the UE, common beam state indication information for configuring the common beam state.

Optionally, the common beam state indication information is used to indicate at least one of the following information:

the common beam state is a valid state;

a valid time during which the common beam state is a valid state; or, the common beam state is an invalid state.

Optionally, the processor executes the program to perform the following steps:

sending common beam state indication information carrying a common beam state information field, where different values of the common beam state information field are used to indicate whether the common beam state is a valid state; or, sending common beam state indication information scrambled by a preset RNTI, where there is a predefined mapping relationship between the preset RNTI and the common beam state; or, sending common beam state indication information carrying an existing information field, where the existing information field is a field used to indicate other information than the common beam state, and there is a predefined mapping relationship between preset values of the existing information field and the common beam state.

Optionally, the common beam state indication information includes timer parameter indication information. The timer parameter indication information is used to indicate the valid time during which the common beam state is the valid state.

Optionally, the common beam state indication information may further include an offset time parameter. The offset time parameter is used to indicate that the common beam state becomes valid after an offset time duration indicated by the offset time parameter passes.

Optionally, the common beam state indication information may be indicated by SIB 1, higher layer signaling or physical layer signaling.

Optionally, the preset event includes at least one of UE beam sweeping, UE beam reporting, UE beam failure, base station beam sweeping, or base station beam indication.

Optionally, the same beam is a beam used by a preset channel or a preset reference signal; or, the same beam is a beam used by a channel indicated by physical layer signaling or high layer signaling; or, the same beam is a beam indicated by physical layer signaling or high layer signaling.

Optionally, the preset channel is one of PDCCH, PDSCH, PUCCH or PUSCH.

The preset reference signal is one of CSI-RS or SRS.

Optionally, the at least two channels and/or reference signals includes at least two of PDCCH, PDSCH, PUCCH, PUSCH, CSI-RS or SRS.

Optionally, the processor executes the program to further perform the following steps:

according to a predefined time pattern for indicating whether the common beam state is valid or invalid, determining a valid time during which the common beam state is the valid state; and determining whether the common beam state is valid according to whether the current time is in the valid time duration.

In FIG. 7, a bus architecture may include any number of interconnected bus and bridge. Specifically, various circuits of one or more processors, which are represented by the processor 701, and one or more memories, which are represented by the memory 703, are linked together. The bus architecture may link various other circuits, such as a peripheral device, voltage regulator and a power management circuit together. These features are well known in this field; therefore, this disclosure does not make further description on these features. The bus interface provides an interface. The transceiver 702 may be multiple elements, including a transmitter and a receiver and provide units, which communicate with other devices on the transmission medium.

The processor 701 is responsible for managing the bus architecture and the normal processing. The memory 703 may be used to store data used by the processor 701 for performing operations.

It is to be noted that the network device in this embodiment is the network device corresponding to the above method shown in FIG. 3, and the implementation manners in the above embodiments are all applicable to the embodiments of the network device, and the same technical effect can also be achieved. In the network device, the transceiver 702 and the memory 703, and the transceiver 702 and the processor 701, may be connected through the bus interface. Functions of the processor 701 may also be realized by the transceiver 702, and functions of the transceiver 702 may also be realized by the processor 701. It is to be noted that the above network device provided in the embodiment of the present disclosure can realize all steps of the above method embodiment, and can achieve the same technical effect. Parts and beneficial effects in this embodiment that are the same as those in the method embodiment will not be described in detail here.

In some embodiments of the present disclosure, a computer-readable storage medium is provided and includes a program stored thereon. The program is executed by a processor to perform the following steps:

determining whether a common beam state of UE is a valid state;

when the common beam state of the UE is the valid state, determining that at least two channels and/or reference signals of the UE use the same beam for transmission.

When the program is executed by the processor, all the implementation manners in the above beam determination method performed by the network device can be implemented, and the same technical effect can be achieved. To avoid repetition, details are not described here.

Those skilled in the art can appreciate that units and algorithm steps of the examples described in conjunction with the embodiments disclosed herein may be implemented by electronic hardware, or a combination of computer software and electronic hardware. Whether these functions are executed by hardware or software depends on the specific application and design constraints of the technical solution. Skilled artisans may implement the described functions using different methods for each particular application, but such implementation should not be considered beyond the scope of the present disclosure.

Those skilled in the art can clearly understand that for the convenience and brevity of the description, the specific working process of the above system, apparatus and unit may refer to the corresponding process in the foregoing method embodiment, which will not be repeated here.

In the embodiments provided in the present disclosure, it is to be understood that the disclosed apparatus and methods may be implemented in other ways. For example, the device embodiments described above are only an example. For example, division of units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may or may not be physically separated, and components shown as units may or may not be physical units, that is, they may be located in one place, or may be distributed to multiple network units. Part or all of the units may be selected according to actual needs to achieve the purpose of the solutions of the embodiments of the present disclosure.

In addition, various functional units in various embodiments of the present disclosure may be integrated into one processing unit, or each unit may be physically included individually, or two or more units may be integrated into one unit.

If the functions are realized in the form of software function units and sold or used as independent products, they may be stored in a computer-readable storage medium. Based on this understanding, the essence of the technical solution of the present disclosure or the part that contributes to the related art or the part of the technical solution may be embodied in the form of a software product. The computer software product is stored in a storage medium, includes several instructions which enables a computer device (which may be a personal computer, a server, or a network device, etc.) to execute all or part of the steps of the methods described in various embodiments of the present disclosure. The storage medium includes various media capable of storing program codes such as U disk, mobile hard disk, ROM, RAM, magnetic disk or optical disk.

The above are optional embodiments of the present disclosure, but the protection scope of the present disclosure is not limited thereto. For persons having ordinary skill in the art, several improvements and changes may be made, without departing from the principle of the present disclosure. These improvements and changes should also be within the scope of the present disclosure. Therefore, the protection scope of the present disclosure should be determined by the protection scope of the claims.

What is claimed is:

1. A beam determination method, performed by a user equipment (UE), comprising:

determining, by the UE, whether a common beam state is a valid state; and determining, by the UE, that at least two channels and/or reference signals of different types of the UE use the same beam for transmission, in case that the common beam state is the valid state;

wherein the determining, by the UE, whether a common beam state is a valid state, includes at least one of the following:

determining, by the UE, whether the common beam state is the valid state according to received common beam state indication information;

determining, by the UE, whether the common beam state is the valid state according to preconfigured time during which the common beam state is the valid state; or, determining, by the UE, whether the common beam state is the valid state according to a preset event on the UE or a network device; wherein the preset event includes at least one of UE beam sweeping, UE beam reporting, UE beam failure, base station beam sweeping, or base station beam indication.

2. The method according to claim 1, wherein the common beam state indication information is used to indicate at least one of the following information: the common beam state is the valid state; a valid time during which the common beam state is the valid state; or, the common beam state is an invalid state.

3. The method according to claim 2, wherein the determining, by the UE, whether the common beam state is the valid state according to received common beam state indication information, includes:
  determining whether the common beam state is the valid state according to a value of a common beam state information field in the common beam state indication information; or,
  determining whether the common beam state is the valid state according to whether RNTI which successfully descrambles the common beam state indication information is a preset RNTI; or,
  determining whether the common beam state is the valid state according to whether a value of an existing information field in the common beam state indication information is a preset value; wherein the existing information field is a field used to indicate other information than the common beam state.

4. The method according to claim 2, wherein the common beam state indication information includes timer parameter indication information; and the timer parameter indication information is used to indicate the valid time during which the common beam state is the valid state;
  wherein the common beam state indication information further includes an offset time parameter; and the offset time parameter is used to indicate that the common beam state becomes valid after an offset time duration indicated by the offset time parameter passes.

5. The method according to claim 1, wherein the same beam is a beam used by a preset channel or a preset reference signal; or, the same beam is a beam used by a channel or a reference signal indicated by physical layer signaling or high layer signaling; or, the same beam is a beam indicated by physical layer signaling or high layer signaling; wherein the preset channel is one of PDCCH, PDSCH, PUCCH or PUSCH; the preset reference signal is one of CSI-RS or SRS;
  or, wherein the at least two channels and/or reference signals includes at least two of PDCCH, PDSCH, PUCCH, PUSCH, CSI-RS or SRS.

6. The method according to claim 1, wherein the determining, by the UE, whether the common beam state is the valid state according to preconfigured time during which the common beam state is the valid state, includes:
  determining, by the UE, the valid time during which the common beam state is the valid state according to a predefined time pattern for indicating whether the common beam state is valid or invalid; and determining whether the common beam state is the valid state according to whether the current time is in the valid time duration.

7. A beam determination method, performed by a network device, comprising:
  determining, by the network device, whether a common beam state is a valid state;
  when the common beam state is the valid state, determining, by the network device, that at least two channels and/or reference signals of different types of the UE use the same beam for transmission;
  wherein the determining, by the network device, whether a common beam state is a valid state, includes at least one of:
    determining, by the network device, whether the common beam state is the valid state according to a common beam state configured by the network device itself for the UE;
    determining, by the network device, whether the common beam state is the valid state according to preconfigured time during which the common beam state is the valid state; or,
    determining, by the network device, whether the common beam state is the valid state according to a preset event on the UE/network side; wherein the preset event includes at least one of UE beam sweeping, UE beam reporting, UE beam failure, base station beam sweeping, or base station beam indication.

8. The method according to claim 7, wherein the method further includes:
  sending, by the network device, to the UE, common beam state indication information for configuring the common beam state;
  wherein the common beam state indication information is used to indicate at least one of the following information:
    the common beam state is the valid state;
    a valid time duration during which the common beam state is the valid state; or,
    the common beam state is an invalid state.

9. The method according to claim 8, wherein the sending, by the network device, to the UE, common beam state indication information for configuring the common beam state, includes:
  sending, by the network device, the common beam state indication information carrying a common beam state information field, wherein different values of the common beam state information field are used to indicate whether the common beam state is the valid state; or,
  sending, by the network device, the common beam state indication information scrambled by a preset RNTI, wherein there is a predefined mapping relationship between the preset RNTI and the common beam state; or,
  sending, by the network device, the common beam state indication information carrying an existing information field, wherein the existing information field is a field used to indicate other information than the common beam state, and there is a predefined mapping relationship between preset values of the existing information field and the common beam state.

10. The method according to claim 8, wherein the common beam state indication information includes timer parameter indication information; and the timer parameter indication information is used to indicate the valid time during which the common beam state is the valid state.

11. The method according to claim 10, wherein the common beam state indication information further includes an offset time parameter; and the offset time parameter is used to indicate that the common beam state becomes valid after an offset time duration indicated by the offset time parameter passes.

12. The method according to claim 7, wherein the same beam is a beam used by a preset channel or a preset reference signal; or, the same beam is a beam used by a channel or a reference signal indicated by physical layer signaling or high layer signaling; or, the same beam is a beam indicated by physical layer signaling or high layer signaling; wherein the preset channel is one of PDCCH, PDSCH, PUCCH or PUSCH; the preset reference signal is one of CSI-RS or SRS;
  or, wherein the at least two channels and/or reference signals includes at least two of PDCCH, PDSCH, PUCCH, PUSCH, CSI-RS or SRS.

13. The method according to claim 7, wherein the determining, by the network device, whether the common beam state is the valid state according to preconfigured time during which the common beam state is the valid state, includes:

determining, by the network device, the valid time during which the common beam state is the valid state, according to a predefined time pattern for indicating whether the common beam state is valid or invalid; and determining whether the common beam state is the valid state according to whether the current time is in the valid time duration.

14. A network device for performing the method according to claim 7, comprising: a memory, a processor, a transceiver, and a program stored on the memory and executable on the processor;

wherein the processor executes the program to perform the following steps:

determining whether a common beam state is a valid state;

when the common beam state is the valid state, determining that at least two channels and/or reference signals of different types of the UE use the same beam for transmission;

wherein the processor executes the program to perform the following steps:

determining whether the common beam state is the valid state according to a common beam state configured by the network device for the UE;

determining whether the common beam state is the valid state according to preconfigured time during which the common beam state is the valid state; or, determining whether the common beam state is the valid state according to a preset event on the UE/network side; wherein the preset event includes at least one of UE beam sweeping, UE beam reporting, UE beam failure, base station beam sweeping, or base station beam indication.

15. A user equipment (UE), comprising: a memory, a processor, a transceiver, and a program stored on the memory and executable on the processor;

wherein the processor executes the program to perform the following steps:

determining whether a common beam state is a valid state;

determining that at least two channels and/or reference signals of different types of the UE use the same beam for transmission, in case that the common beam state is the valid state;

wherein the processor executes the program to perform the following steps:

determining whether the common beam state is the valid state according to received common beam state indication information;

determining whether the common beam state is the valid state according to preconfigured time during which the common beam state is the valid state; or, determining whether the common beam state is the valid state according to a preset event on the UE or a network device; wherein the preset event includes at least one of UE beam sweeping, UE beam reporting, UE beam failure, base station beam sweeping, or base station beam indication.

* * * * *